United States Patent
Kudo

(10) Patent No.: US 11,295,945 B2
(45) Date of Patent: Apr. 5, 2022

(54) TIME-OF-FLIGHT MASS SPECTROMETER

(71) Applicant: SHIMADZU CORPORATION, Kyoto (JP)

(72) Inventor: Tomoya Kudo, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 17/052,236

(22) PCT Filed: May 16, 2018

(86) PCT No.: PCT/JP2018/018852
§ 371 (c)(1),
(2) Date: Nov. 2, 2020

(87) PCT Pub. No.: WO2019/220553
PCT Pub. Date: Nov. 21, 2019

(65) Prior Publication Data
US 2021/0249249 A1    Aug. 12, 2021

(51) Int. Cl.
| | | |
|---|---|---|
| *H01J 49/40* | (2006.01) | |
| *H01J 49/10* | (2006.01) | |
| *G01N 30/72* | (2006.01) | |
| *H01J 49/24* | (2006.01) | |
| *G01N 30/02* | (2006.01) | |

(52) U.S. Cl.
CPC ........ *H01J 49/405* (2013.01); *G01N 30/7233* (2013.01); *H01J 49/10* (2013.01); *H01J 49/24* (2013.01); *G01N 2030/027* (2013.01)

(58) Field of Classification Search
CPC .......... H01J 49/40; H01J 49/24; H01J 49/401; H01J 49/403; H01J 49/405; H01J 49/004; H01J 49/063; H01J 49/0481; G01N 27/62; G01N 30/7233
See application file for complete search history.

(56) References Cited

U.S. PATENT DOCUMENTS

| | | | |
|---|---|---|---|
| 2014/0054456 A1 | 2/2014 | Kinugawa et al. | |
| 2014/0264011 A1* | 9/2014 | Welkie | H01J 49/403 250/287 |
| 2015/0270115 A1* | 9/2015 | Furuhashi | H01J 49/405 250/287 |

FOREIGN PATENT DOCUMENTS

| | | |
|---|---|---|
| JP | 5862791 B2 | 2/2016 |
| JP | 5924387 B2 | 5/2016 |

OTHER PUBLICATIONS

International Search Report for PCT/JP2018/018852 dated Jul. 17, 2018 [PCT/ISA/210].

(Continued)

*Primary Examiner* — David E Smith
*Assistant Examiner* — Hsien C Tsai
(74) *Attorney, Agent, or Firm* — Sughrue Mion, PLLC

(57) ABSTRACT

A no-electric field region (246A) and an electric field region (246B) are formed in a flight tube (246). In the no-electric field region (246A), ions introduced from an ion emission unit fly. In the electric field region (246B), a reflectron (244) is provided and the ions having passed through the no-electric field region (246A) are reflected to the no-electric field region (246A) by an action of an electric field formed on an inner side of a plurality of electrodes (244A, 244B). A through-hole (246D) is formed in at least a part of the flight tube (246) to be closer to the electric field region (246B) than the no-electric field region (246A).

8 Claims, 4 Drawing Sheets

(56) References Cited

OTHER PUBLICATIONS

Written Opinion for PCT/JP2018/018852 dated Jul. 17, 2018 [PCT/ISA/237].

* cited by examiner

TIME-OF-FLIGHT MASS SPECTROMETER

CROSS REFERENCE TO RELATED APPLICATIONS

This application is a National Stage of International Application No. PCT/JP2018/018852 filed May 16, 2018.

TECHNICAL FIELD

The present invention relates to a time-of-flight mass spectrometer including a hollow flight tube into which ions emitted from an ion emission unit are introduced.

BACKGROUND ART

In a time-of-flight mass spectrometer (TOFMS), ions to be analyzed are emitted from an ion emission unit, and the ions fly in a hollow flight tube and then are detected by a detector. As a result, the time of flight of the ion until the ion reaches the detector is measured, and the mass-to-charge ratio m/z of the ion is calculated on the basis of the time of flight (for example, refer to Patent Documents 1 and 2).

The flight tube is provided in a vacuum chamber. A vacuum vessel that becomes in a vacuum state during analysis is formed in the vacuum chamber, the flight tube is provided in the vacuum vessel, and thereby the flight tube also becomes in a vacuum state during analysis.

A reflectron is provided in the flight tube. The reflectron is configured by coaxially arranging a plurality of loop electrodes. By applying a voltage to each of these electrodes, an electric field is formed on an inner side of each electrode (inner side of the reflectron).

The ions introduced from the ion emission unit into the flight tube pass through a no-electric field region where no reflectron is provided, and then fly to an electric field region formed on the inner side of the reflectron. In the electric field region, the ions are reflected by the action of the electric field and are again guided to the no-electric field region, and the ions having passed through the no-electric field region are detected by the detector.

In the time-of-flight mass spectrometers disclosed in Patent Documents 1 and 2, a so-called dual stage reflectron is used. In this type of reflectron, among a plurality of electrodes constituting the corresponding reflectron, a first stage is composed of a part of the electrodes on the no-electric field region side, and a second stage is composed of the remaining electrode (a part of the electrodes on a side opposite to the no-electric field region side). The voltages to be applied to the electrodes constituting the first stage and the second stage are different. Therefore, electric fields having different potential distributions are formed in the first stage and the second stage.

PRIOR ART DOCUMENTS

Patent Documents

Patent Document 1: Japanese Patent No. 5924387
Patent Document 2: Japanese Patent No. 5862791

SUMMARY OF THE INVENTION

Problems to be Solved by the Invention

In order to realize high resolution, it is extremely important that the positional relationship between the electrodes constituting the second stage and the ion emission unit is accurate. Therefore, the flight tube is formed to extend to the end of the reflectron, and the reflectron is configured to be in the flight tube by stacking the electrodes toward the ion emission unit with reference to the end position.

However, in a case where the flight tube is formed to extend to the end of the reflectron as described above, when the vacuum vessel is brought into a vacuum state, the outflow of gas in the flight tube becomes worse. As a result, there is a problem that the degree of vacuum in the electric field region formed on the inner side of the reflectron is lowered and the resolution is lowered. In particular, since at the end portion of the reflectron, the kinetic energy of the ions is small and an adverse effect due to collision with gas is likely to occur, when the degree of vacuum is lowered at this portion, the deterioration of the performance such as resolution becomes remarkable.

Further, each electrode constituting the reflectron is supplied with power from a voltage divider through a wiring. In order to check the connection status of the wiring connected to each electrode, check whether there is misalignment in each electrode, and check for other abnormalities, it is preferable that the reflectron can be visually observed directly from the outside. However, in the configuration in which the reflectron is covered with the flight tube, the reflectron cannot be easily visually observed from the outside.

The invention has been made in view of the above circumstances, and an object thereof is to provide a time-of-flight mass spectrometer which can improve the degree of vacuum in an electric field region formed on an inner side of a reflectron. Another object of the invention is to provide a time-of-flight mass spectrometer in which the reflectron can be easily visually observed from the outside.

Means for Solving the Problems (1) A time-of-flight mass spectrometer according to the invention includes an ion emission unit, a flight tube, a reflectron, and a vacuum chamber. The ion emission unit emits ions to be analyzed. The flight tube is hollow, and the ions emitted from the ion emission unit are introduced into the flight tube. The reflectron is provided in the flight tube, and is configured by coaxially arranging a plurality of loop electrodes. A vacuum vessel that becomes in a vacuum state during analysis is formed in the vacuum chamber, and the flight tube is provided in the vacuum vessel.

A no-electric field region and an electric field region are formed in the flight tube. In the no-electric field region, the ions introduced from the ion emission unit fly. In the electric field region, the reflectron is provided and the ions having passed through the no-electric field region are reflected to the no-electric field region by an action of an electric field formed on an inner side of the plurality of electrodes. A first through-hole is formed in at least a part of the flight tube to be closer to the electric field region than the no-electric field region.

With such a configuration, since the first through-hole is formed in at least a part of the flight tube to be closer to the electric field region than the no-electric field region, when the vacuum vessel is brought into a vacuum state, the gas in the flight tube can be easily released via the first through-hole. Thereby, the degree of vacuum of the electric field region formed on the inner side of the reflectron can be improved. As a result, retention of the ions in the flight tube is eliminated, and the reduction in resolution and sensitivity can be prevented.

Further, the reflectron provided in the flight tube can be easily visually observed from the outside via the first through-hole formed on the flight tube. As a result, since it becomes easy to check the connection status of the wiring connected to each of the electrodes constituting the reflectron, check whether there is misalignment in each of the electrodes, and check for other abnormalities, the maintainability is improved.

(2) The flight tube may have a tubular side wall. In this case, the first through-hole may be formed on the side wall.

With such a configuration, the gas in the flight tube can be easily released via the first through-hole formed on the side wall of the flight tube, and the reflectron provided in the flight tube can be easily visually observed from the side.

(3) The electric field region may include a first region where the ions having passed through the no-electric field region are decelerated, and a second region where the ions decelerated in the first region are reflected. In this case, the first through-hole may be formed on the side wall at a position facing at least the second region.

With such a configuration, among the first region (first stage) and the second region (second stage) constituting the electric field region, the gas in the flight tube can be easily released in the second region, and the reflectron can be easily visually observed from the side in the second region. Since the release of the gas in the flight tube becomes particularly bad on the second region side, the degree of vacuum of the electric field region can be effectively improved by forming the first through-hole at a position facing the second region.

(4) The flight tube may be formed in a bottomed tubular shape having a bottom surface on the electric field region side. In this case, the first through-hole may be formed on the bottom surface.

With such a configuration, the gas in the flight tube can be easily released via the first through-hole formed on the bottom surface of the flight tube, and the reflectron provided in the flight tube can be easily visually observed from the bottom surface side.

(5) A second through-hole may be formed on the vacuum chamber at a position facing at least a part of the first through-hole.

With such a configuration, the reflectron provided in the flight tube can be easily visually observed from the outside of the vacuum chamber via the first through-hole and the second through-hole at least partially facing each other. A third through-hole different from the second through-hole may be formed on the vacuum chamber. In this case, the time-of-flight mass spectrometer may further include a lid member that closes the second through-hole, and a vacuum pump connected to the third through-hole.

(6) The time-of-flight mass spectrometer may further include a voltage divider. The voltage divider is provided in the flight tube, and applies voltages divided using a plurality of resistors to the plurality of electrodes. In this case, the first through-hole may be formed at a position facing at least a part of the plurality of resistors.

With such a configuration, since the first through-hole is formed on the flight tube at a position facing at least a part of the plurality of resistors, the influence of radiant heat from the resistors to the flight tube can be suppressed, and thermal expansion of the flight tube can be prevented. Accordingly, since it is possible to prevent the time of flight of the ions in the flight tube from fluctuating due to the thermal expansion of the flight tube, the measurement accuracy is improved.

Effects of the Invention

According to the invention, since the gas in the flight tube can be easily released via the first through-hole when the vacuum vessel is brought into a vacuum state, the degree of vacuum of the electric field region formed on the inner side of the reflectron can be improved. Further, according to the invention, the reflectron provided in the flight tube can be easily visually observed from the outside via the first through-hole formed on the flight tube.

MODE FOR CARRYING OUT THE INVENTION

1. Overall Configuration of Liquid Chromatograph Mass Spectrometer

Figure 1:
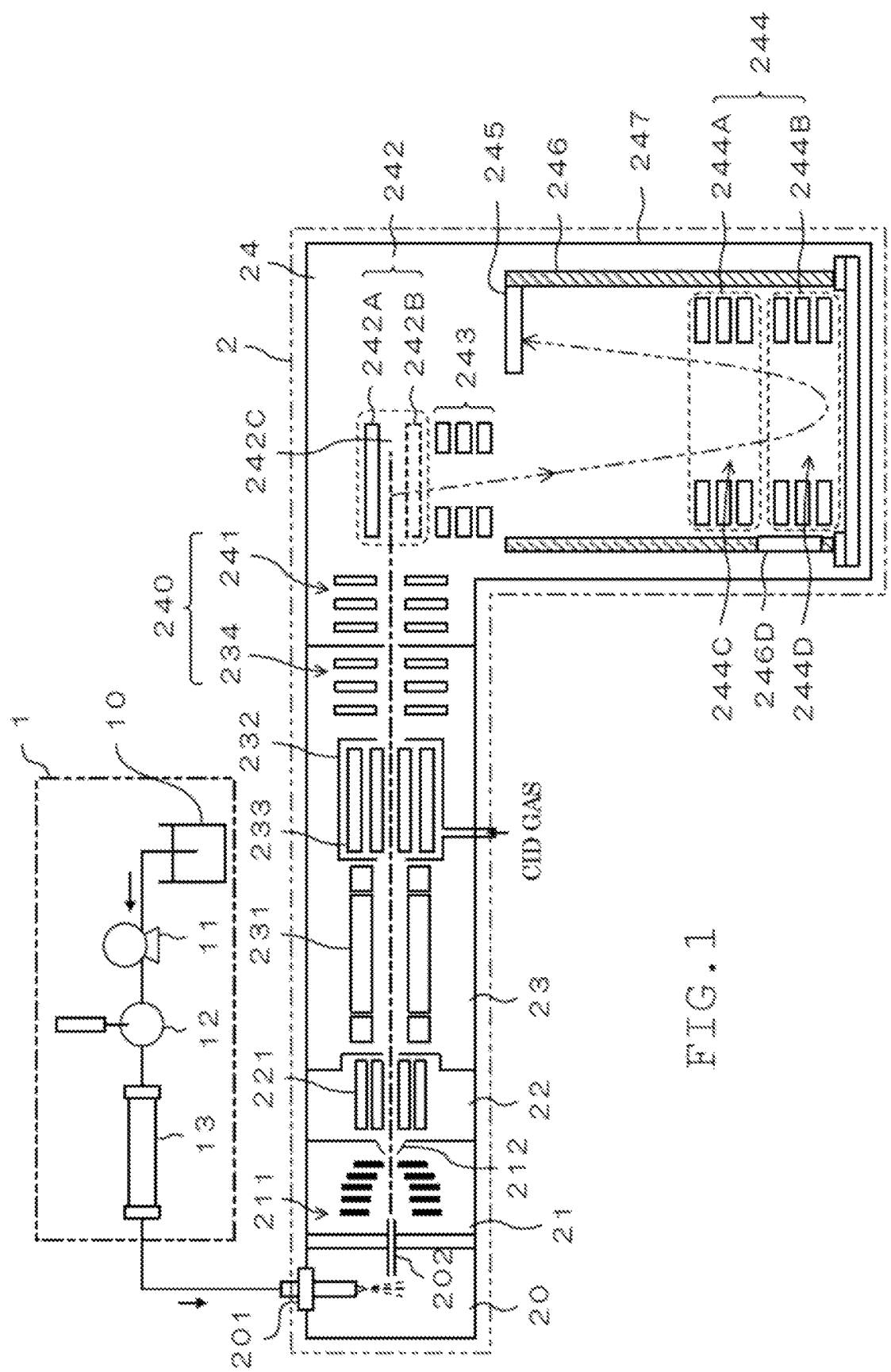
FIG. 1 is a schematic diagram illustrating a configuration example of a liquid chromatograph mass spectrometer including a time-of-flight mass spectrometer according to an embodiment of the invention.

FIG. 1 is a schematic diagram illustrating a configuration example of a liquid chromatograph mass spectrometer including a time-of-flight mass spectrometer according to an embodiment of the invention. The liquid chromatograph mass spectrometer includes a liquid chromatograph unit 1 and a mass spectrometer unit 2.

The liquid chromatograph unit 1 includes a mobile phase container 10, a pump 11, an injector 12, a column 13, and the like. A mobile phase is stored in the mobile phase container 10. The pump 11 sends out the mobile phase in the mobile phase container 10 to the injector 12. In the injector 12, a predetermined amount of sample is injected into the mobile phase from the mobile phase container 10. The mobile phase into which the sample is injected is introduced into the column 13, and respective components in the sample are separated in the course of passing through the column 13. The respective components in the sample separated by the column 13 are sequentially supplied to the mass spectrometer unit 2.

The mass spectrometer unit 2 is configured by a time-of-flight mass spectrometer (TOFMS), and an ionization chamber 20, a first intermediate chamber 21, a second intermediate chamber 22, a third intermediate chamber 23, an analysis chamber 24, and the like are formed inside the mass spectrometer unit 2. The inside of the ionization chamber 20 is substantially at atmospheric pressure. Each of the first intermediate chamber 21, the second intermediate chamber 22, the third intermediate chamber 23, and the analysis chamber 24 is brought into a vacuum state (negative pressure state) by driving a vacuum pump (not illustrated). The ionization chamber 20, the first intermediate chamber 21, the second intermediate chamber 22, the third intermediate chamber 23, and the analysis chamber 24 communicate with each other, and are configured such that the degree of vacuum is gradually increased in this order.

The ionization chamber 20 is provided with a spray 201 such as an electro spray ionization (ESI) spray. A sample liquid containing respective components in the sample supplied from the liquid chromatograph unit 1 is sprayed into the ionization chamber 20 by the spray 201 while being charged. As a result, ions derived from the respective components in the sample are generated. However, the ionization method used in the mass spectrometer unit 2 is not limited to the ESI, and other ionization methods such as atmospheric pressure chemical ionization (APCI) or probe electro spray ionization (PESI) may be used.

The first intermediate chamber 21 communicates with the ionization chamber 20 via a heating capillary 202 composed of a small-diameter tube. Further, the second intermediate chamber 22 communicates with the first intermediate chamber 21 via a skimmer 212 composed of a small hole. The first intermediate chamber 21 and the second intermediate chamber 22 are respectively provided with ion guides 211 and 221 each of which is for focusing the ions and sending the ions to the subsequent stage.

The third intermediate chamber 23 is provided with, for example, a quadrupole mass filter 231 and a collision cell 232. A collision induced dissociation (CID) gas such as argon or nitrogen is continuously or intermittently supplied to the inside of the collision cell 232. A multipole ion guide 233 is provided in the collision cell 232.

The ions flowing from the second intermediate chamber 22 to the third intermediate chamber 23 are separated by the quadrupole mass filter 231 according to the mass-to-charge ratio, and only the ions having a specific mass-to-charge ratio pass through the quadrupole mass filter 231. The ions that have passed through the quadrupole mass filter 231 are introduced into the collision cell 232 as precursor ions, and are brought into contact with the CID gas to be cleaved to generate product ions. The generated product ions are temporarily held by the multipole ion guide 233, and emitted from the collision cell 232 at a predetermined timing.

A transfer electrode unit 240 is provided in the third intermediate chamber 23 and the analysis chamber 24 so as to straddle the chambers. The transfer electrode unit 240 includes one or a plurality of first electrodes 234 provided in the third intermediate chamber 23 and one or a plurality of second electrodes 241 provided in the analysis chamber 24. The first electrode 234 and the second electrode 241 are each formed in a loop shape and are coaxially arranged. The ions (product ions) emitted from the collision cell 232 are focused by passing through the inner side of the plurality of electrodes 234 and 241 in the transfer electrode unit 240.

In addition to the second electrode 241, an orthogonal acceleration unit 242, an acceleration electrode unit 243, a reflectron 244, a detector 245, a flight tube 246, and the like are provided in the analysis chamber 24. The flight tube 246 is, for example, a hollow member of which both ends are open, and the reflectron 244 is arranged inside the flight tube 246.

The ions enter the orthogonal acceleration unit 242 from the transfer electrode unit 240. The orthogonal acceleration unit 242 includes a pair of electrodes 242A and 242B facing each other with a space therebetween. The pair of electrodes 242A and 242B extends parallel to an incident direction of the ions from the transfer electrode unit 240, and an orthogonal acceleration region 242C is formed between the electrodes 242A and 242B.

One electrode 242B is configured by a grid electrode having a plurality of openings. The ions that enter the orthogonal acceleration region 242C are accelerated in a direction orthogonal to the incident direction of the ions, pass through the openings of the one electrode 242B, and are guided to the acceleration electrode unit 243. In the present embodiment, the orthogonal acceleration unit 242 constitutes an ion emission unit that emits ions to be analyzed. The ions emitted from the orthogonal acceleration unit 242 are further accelerated by the acceleration electrode unit 243, and are introduced into the flight tube 246.

The reflectron 244 provided in the flight tube 246 includes one or a plurality of first electrodes 244A and one or a plurality of second electrodes 244B. The first electrode 244A and the second electrode 244B are each formed in a loop shape and are coaxially arranged along the axis of the flight tube 246. Different voltages are applied to the first electrode 244A and the second electrode 244B, respectively.

The ions introduced into the flight tube 246 are guided into a flight space formed in the flight tube 246, fly into the flight space, and then enter the detector 245. Specifically, the ions introduced into the flight tube 246 are turned in a U shape to enter the detector 245 by being decelerated in a first region (first stage) 244C formed on the inner side of the first electrode 244A, and then being reflected in a second region (second stage) 244D formed on the inner side of the second electrode 244B.

The time of flight from when the ion is emitted from the orthogonal acceleration unit 242 to when the ion enters the detector 245 depends on the mass-to-charge ratio of the ion. Therefore, the mass-to-charge ratio of each ion can be calculated based on the time of flight of each ion emitted from the orthogonal acceleration unit 242, and the mass spectrum can be created.

2. Specific Configuration Around Flight Tube

Figure 2:
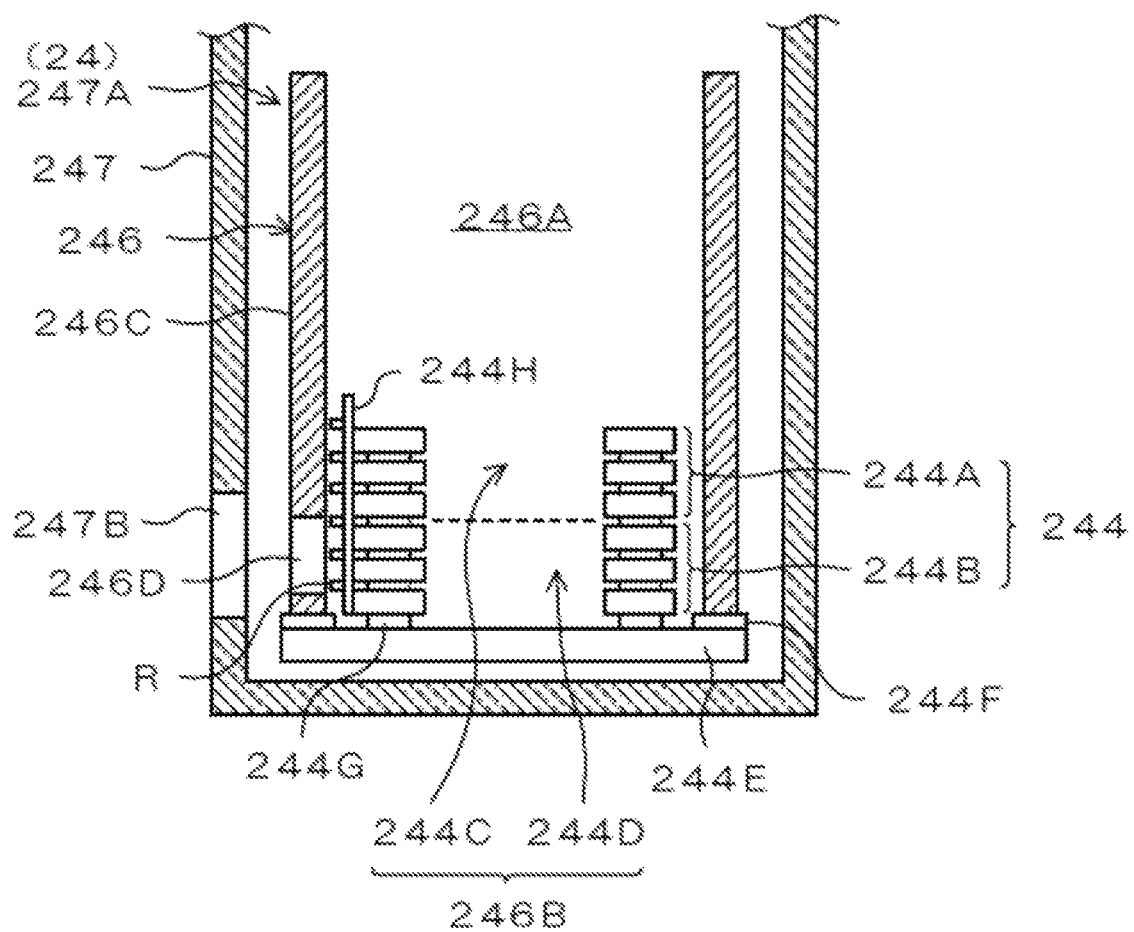
FIG. 2 is a schematic diagram illustrating a specific configuration around a flight tube.

FIG. 2 is a schematic diagram illustrating a specific configuration around the flight tube 246. The flight tube 246 is provided in a vacuum chamber 247. A vacuum vessel 247A that becomes in a vacuum state during analysis is formed in the vacuum chamber 247, and the flight tube 246 is provided in the vacuum vessel 247A. In the present embodiment, the vacuum vessel 247A is the above-mentioned analysis chamber 24.

In the flight tube 246, the reflectron 244 is provided at a position biased to a side opposite to the orthogonal acceleration unit 242 side (the ion emission unit side). Thereby, in the flight tube 246, a region (no-electric field region 246A) where the reflectron 244 is not provided and a region (electric field region 246B) where the reflectron 244 is provided are formed sequentially from the orthogonal acceleration unit 242 side.

The no-electric field region 246A is a region where the electric field due to the reflectron 244 does not act or is hard to act. The ions introduced from the orthogonal acceleration unit 242 into the flight tube 246 fly straight in the no-electric field region 246A and enter the electric field region 246B in the reflectron 244. In the electric field region 246B, an electric field is formed on the inner side of the plurality of electrodes 244A and 244B. The ions that have passed through the no-electric field region 246A are reflected to the no-electric field region 246A by the action of the electric field formed in the electric field region 246B.

The electric field region 246B includes the above-described first region (first stage) 244C and second region (second stage) 244D. The electric field formed in the first region 244C is stronger than the electric field formed in the second region 244D.

An end surface opening of the flight tube 246 on the electric field region 246B side is covered with an end electrode 244E. The end electrode 244E is attached to the end surface of the flight tube 246 via an insulation member 244F. The electrodes 244A and 244B of the reflectron 244 are sequentially stacked from the end electrode 244E via an insulation member 244G. In this way, the reflectron 244 is arranged in the flight tube 246 with high positional accuracy by being stacked with the end electrode 244E as a reference.

In the present embodiment, a through-hole (first through-hole) 246D is formed on a tubular side wall 246C of the flight tube 246. The through-hole 246D is formed in at least a part of the side wall 246C of the flight tube 246 to be closer to the electric field region 246B than the no-electric field region 246A. That is, on the side wall 246C of the flight tube 246, the through-hole 246D is formed only at a position facing the electric field region 246B, and the through-hole 246D is not formed at a position facing the no-electric field region 246A.

More specifically, the through-hole 246D is formed on the side wall 246C of the flight tube 246 at a position facing the second region 244D. Thus, the through-hole 246D is preferably formed in the vicinity of the end of the flight tube 246 on a side opposite to the orthogonal acceleration unit 242 side (ion emission unit side). However, the through-hole 246D may be formed to straddle from the position facing the second region 244D on the side wall 246C of the flight tube 246 to a position facing the first region 244C. Further, the number of through-holes 246D is not limited to one, and a plurality of through-holes 246D may be formed.

In the vacuum chamber 247, a through-hole (second through-hole) 247B is formed at a position facing at least a part of the through-hole 246D formed on the flight tube 246. That is, the through-holes 246D and 247B are provided close to each other such that a part or all of the through-hole 246D formed on the flight tube 246 can be seen when the through-hole 247B is viewed from the outside of the vacuum chamber 247 along a penetration direction of the through-hole 247B. The through-hole 247B can be closed by a lid member (not illustrated) that can be attached to and detached from the vacuum chamber 247.

In the present embodiment, a voltage is applied to each of the electrodes 244A and 244B of the reflectron 244 by a voltage divider 244H. A plurality of resistors R are mounted on the voltage divider 244H, and the voltages divided by the resistors R are applied to the electrodes 244A and 244B.

The voltage divider 244H is provided ins the flight tube 246 and is configured integrally with the electrodes 244A and 244B. More specifically, the voltage divider 244H extends parallel to the side wall 246C of the flight tube 246, and is arranged to be close to the side wall 246C such that a mounting surface on which the resistors R are mounted faces the side wall 246C.

The through-hole 246D formed on the flight tube 246 faces at least a part of the plurality of resistors R. That is, the voltage divider 244H is arranged such that a part or all of the plurality of resistors R can be seen when the through-hole 246D is viewed from the outside of the flight tube 246 along the penetration direction of the through-hole 246D.

3. Effects (1) In the present embodiment, since the through-hole 246D is formed in at least a part of the flight tube 246 to be closer to the electric field region 246B than the no-electric field region 246A, when the vacuum vessel 247A is brought into a vacuum state, the gas in the flight tube 246 can be easily released via the through-hole 246D. Thereby, the degree of vacuum of the electric field region 246B formed on the inner side of the reflectron 244 can be improved. As a result, retention of the ions in the flight tube 246 is eliminated, and the reduction in resolution and sensitivity can be prevented.

(2) Further, the reflectron 244 provided in the flight tube 246 can be easily visually observed from the outside via the through-hole 246D formed on the flight tube 246. As a result, since it becomes easy to check the connection status of the wiring connected to each of the electrodes 244A and 244B constituting the reflectron 244, check whether there is misalignment in each of the electrodes 244A and 244B, and check for other abnormalities, the maintainability is improved.

(3) In the present embodiment, the through-hole 246D is formed on the side wall 246C of the flight tube 246. Therefore, the gas in the flight tube 246 can be easily released via the through-hole 246D, and the reflectron 244 provided in the flight tube 246 can be easily visually observed from the side.

(4) Further, in the present embodiment, the through-hole 246D is formed on the side wall 246C of the flight tube 246 at a position facing the second region 244D. Therefore, among the first region 244C and the second region 244D constituting the electric field region 246B, the gas in the flight tube 246 can be easily released in the second region 244D, and the reflectron 244 can be easily visually observed from the side in the second region 244D. Since the release of the gas in the flight tube 246 becomes particularly bad on the second region 244D side, the degree of vacuum of the electric field region 246B can be effectively improved by forming the through-hole 246D at a position facing the second region 244D.

(5) Further, in the present embodiment, the through-hole 247B of the vacuum chamber 247 is formed at a position facing the through-hole 246D of the flight tube 246. Thereby, the reflectron 244 provided in the flight tube 246 can be easily visually observed from the outside of the vacuum chamber 247 via the through-hole 246D and the through-hole 247B facing each other.

(6) Further, in the present embodiment, since the through-hole 246D is formed on the flight tube 246 at a position facing at least a part of the plurality of resistors R, the influence of radiant heat from the resistors R to the flight tube 246 can be suppressed, and thermal expansion of the flight tube 246 can be prevented. Accordingly, since it is possible to prevent the time of flight of the ions in the flight tube 246 from fluctuating due to the thermal expansion of the flight tube 246, the measurement accuracy is improved.

4. Modification Example

Figure 3:
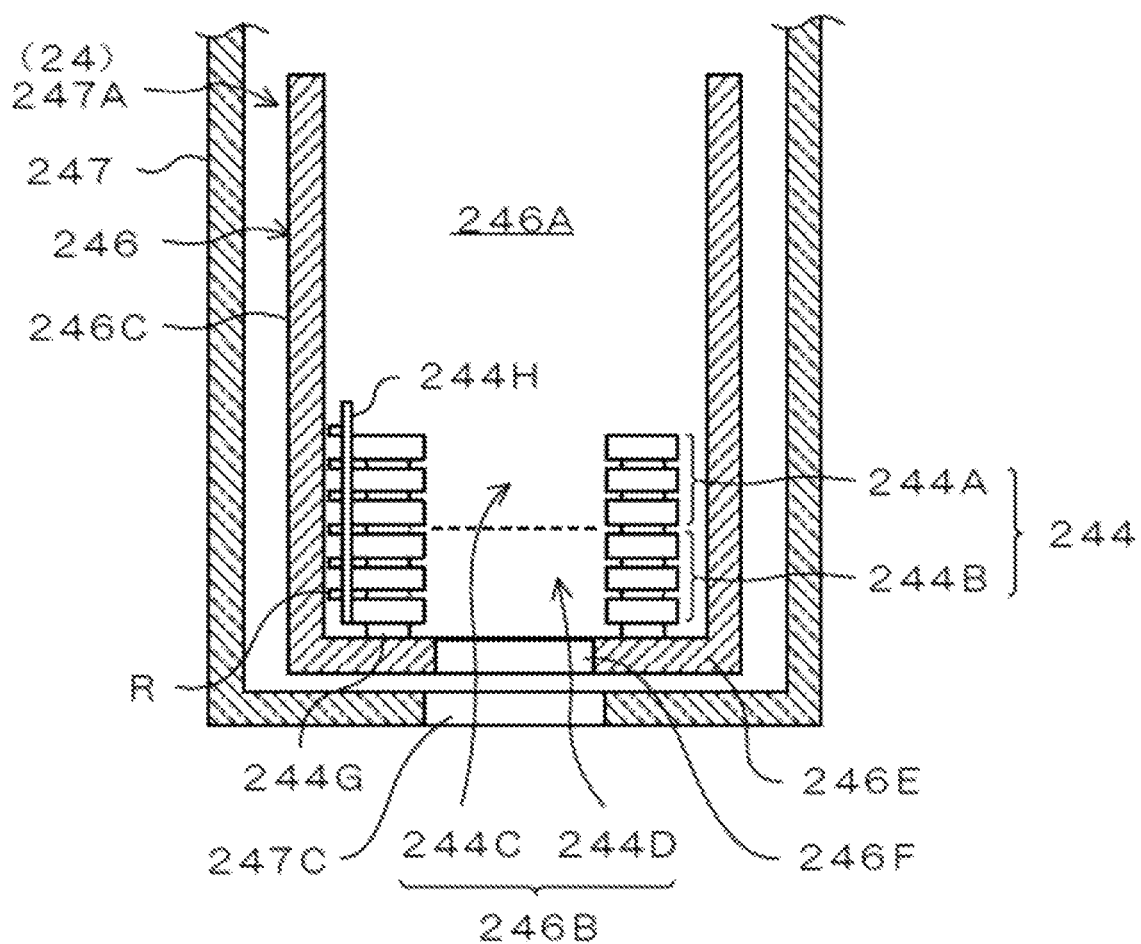
FIG. 3 is a schematic diagram illustrating a first modification example of a configuration around the flight tube.

FIG. 3 is a schematic diagram illustrating a first modification example of a configuration around the flight tube 246. In this modification example, the shape of the flight tube 246 and the positions of the through-holes 246D and 247B are different from those in the above embodiment. In the drawing, the same reference numerals are given to the configurations similar to those in the above-described embodiment, and detailed description thereof will be omitted.

The flight tube 246 in FIG. 3 is formed in a bottomed tubular shape having a bottom surface 246E at the end portion on the electric field region 246B side. That is, the end portion of the flight tube 246 on the electric field region 246B side is closed by the bottom surface 246E, and the end electrode 244E illustrated in FIG. 2 is omitted. The electrodes 244A and 244B of the reflectron 244 are sequentially stacked from the bottom surface 246E via the insulation member 244G.

A through-hole (first through-hole) 246F is formed in the center of the bottom surface 246E of the flight tube 246. This through-hole 246F is located closer to the electric field region 246B than the no-electric field region 246A in the flight tube 246.

In the vacuum chamber 247, a through-hole (second through-hole) 247C is formed at a position facing at least a part of the through-hole 246F formed on the flight tube 246. That is, the through-holes 246F and 247C are provided close to each other such that a part or all of the through-hole 246F formed on the flight tube 246 can be seen when the through-hole 247C is viewed from the outside of the vacuum chamber 247 along the penetration direction of the through-hole 247C.

In this modification example, the gas in the flight tube 246 can be easily released via the through-hole 246F formed on the bottom surface 246E of the flight tube 246, and the reflectron 244 provided in the flight tube 246 can be easily visually observed from the bottom surface 246E side.

Figure 4:
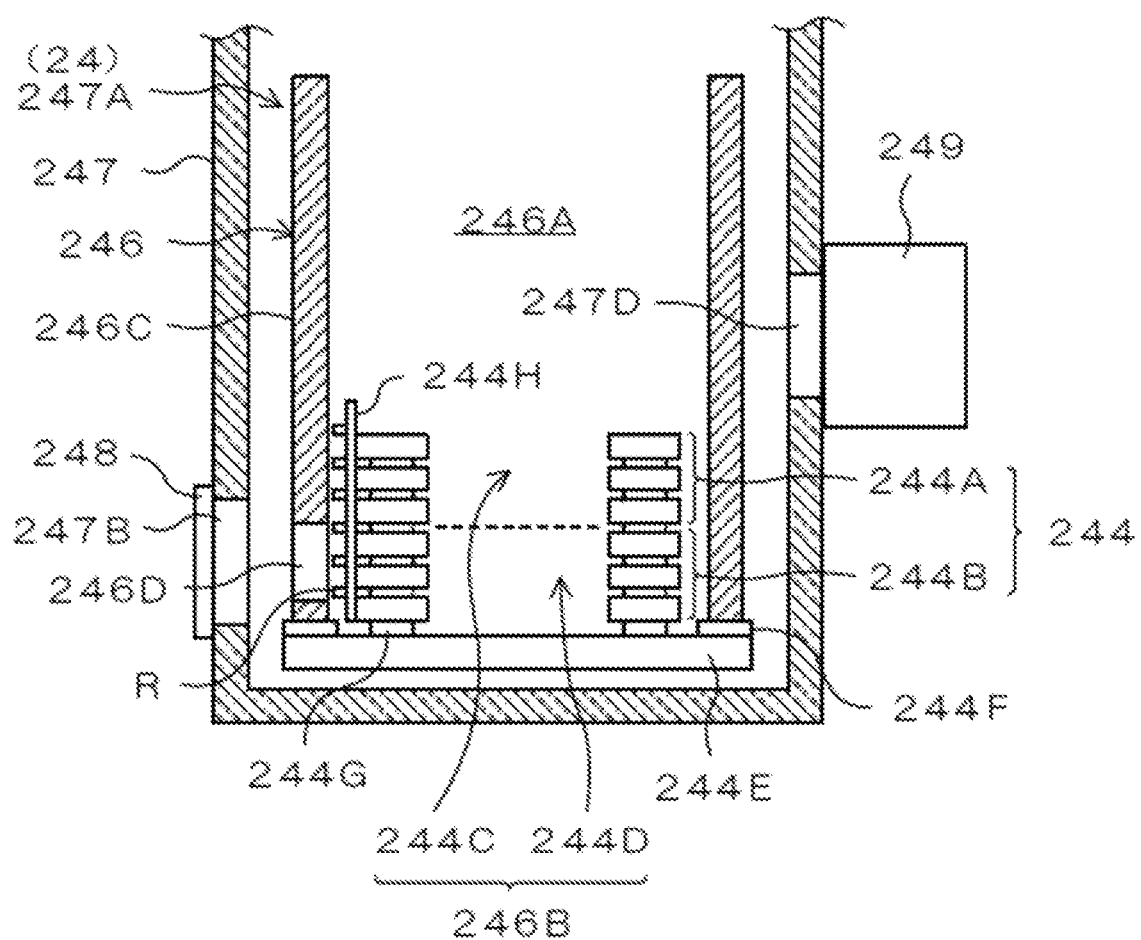
FIG. 4 is a schematic diagram illustrating a second modification example of a configuration around the flight tube.

FIG. 4 is a schematic diagram illustrating a second modification example of a configuration around the flight tube 246. This modification example is different from the above embodiment in that a through-hole 247D (third through-hole) different from the through-hole 247B (second through-hole) is formed in the vacuum chamber 247. In the drawing, the same reference numerals are given to the configurations similar to those in the above-described embodiment, and detailed description thereof will be omitted.

The through-hole 247B is closed by an attachable and detachable lid member 248. A vacuum pump 249 is connected to the through-hole 247D. The vacuum pump 249 is configured by, for example, a turbo molecular pump. By discharging the gas in the vacuum chamber 247 and the flight tube 246 using the vacuum pump 249, the inside of the vacuum chamber 247 and the flight tube 246 is made to reach a predetermined degree of vacuum. However, the position where the through-hole 247D is formed in the vacuum chamber 247 is not limited to the position illustrated in FIG. 4.

As described above, according to the mode in which the through-hole 247D different from the through-hole 247B is formed in the vacuum chamber 247 and the vacuum pump 249 is connected to the vacuum chamber 247 by using the through-hole 247D, the inside of the vacuum chamber 247 can be easily visually observed only by removing the lid member 248 that closes the through-hole 247B without removing the vacuum pump 249 from the vacuum chamber 247, and the maintainability can be further improved. In the configuration as illustrated in FIG. 3, a through-hole different from the through-hole 247C (second through-hole) may be formed in the vacuum chamber 247, and the vacuum pump 249 may be connected to the vacuum chamber 247 by using the through-hole.

However, the invention is not limited to such a configuration, and the vacuum pump 249 can be connected to the vacuum chamber 247 by using the through-hole 247B or the through-hole 247C in the above embodiment.

In the above embodiment, the case where the ion emission unit that emits the ions to be analyzed is configured by the orthogonal acceleration unit 242 has been described. However, the invention is not limited to the orthogonal acceleration time-of-flight mass spectrometer, and can be applied to a linear acceleration time-of-flight analyzer.

Further, the time-of-flight mass spectrometer according to the invention is not limited to the one configured as a liquid chromatograph mass spectrometer by being connected to the liquid chromatograph unit 1, and may be configured so as not to be connected to the liquid chromatograph unit 1 such as a configuration using, for example, matrix assisted laser desorption/ionization (MALDI).

DESCRIPTION OF REFERENCE SIGNS 1 liquid chromatograph unit
2 mass spectrometer unit
242 orthogonal acceleration unit
244 reflectron
244A first electrode
244B second electrode
244C first region
244D second region
244E end electrode
244F insulation member
244G insulation member
244H voltage divider
246 flight tube
246A no-electric field region
246B electric field region
246C side wall
246D through-hole
246E bottom surface
246F through-hole
247 vacuum chamber
247A vacuum vessel
247B through-hole
247C through-hole
247D through-hole
248 lid member
249 vacuum pump

The invention claimed is:

1. A time-of-flight mass spectrometer comprising:
an ion emission unit that emits ions to be analyzed;
a hollow flight tube into which the ions emitted from the ion emission unit are introduced;
a reflectron which is provided in the flight tube, and is configured by coaxially arranging a plurality of loop electrodes; and
a vacuum chamber in which a vacuum vessel that becomes in a vacuum state during analysis is formed and the flight tube is provided in the vacuum vessel,
wherein a no-electric field region where the ions introduced from the ion emission unit fly, and an electric field region where the reflectron is provided and the ions having passed through the no-electric field region are reflected to the no-electric field region by an action of an electric field formed on an inner side of the plurality of electrodes are formed in the flight tube, and
a first through-hole is formed in at least a part of the flight tube to be closer to the electric field region than the no-electric field region.

2. The time-of-flight mass spectrometer according to claim 1,
wherein the flight tube has a tubular side wall, and
the first through-hole is formed on the side wall.

3. The time-of-flight mass spectrometer according to claim 2,
wherein the electric field region includes a first region where the ions having passed through the no-electric field region are decelerated, and a second region where the ions decelerated in the first region are reflected, and
the first through-hole is formed on the side wall at a position facing at least the second region.

4. The time-of-flight mass spectrometer according to claim 1, wherein the flight tube is formed in a bottomed tubular shape having a bottom surface on the electric field region side, and the first through-hole is formed on the bottom surface.

5. The time-of-flight mass spectrometer according to claim 1, wherein a second through-hole is formed on the vacuum chamber at a position facing at least a part of the first through-hole.

6. The time-of-flight mass spectrometer according to claim 1, further comprising:

a voltage divider which is provided in the flight tube and applies voltages divided using a plurality of resistors to the plurality of electrodes, wherein the first through-hole is formed at a position facing at least a part of the plurality of resistors.

7. The time-of-flight mass spectrometer according to claim 5, wherein a third through-hole different from the second through-hole is formed on the vacuum chamber.

8. The time-of-flight mass spectrometer according to claim 7, further comprising:

a lid member that closes the second through-hole; and a vacuum pump connected to the third through-hole.

* * * * *